May 2, 1967  P. R. HUGHES ET AL  3,316,692
LIQUID STORAGE TANK
Filed Dec. 15, 1965
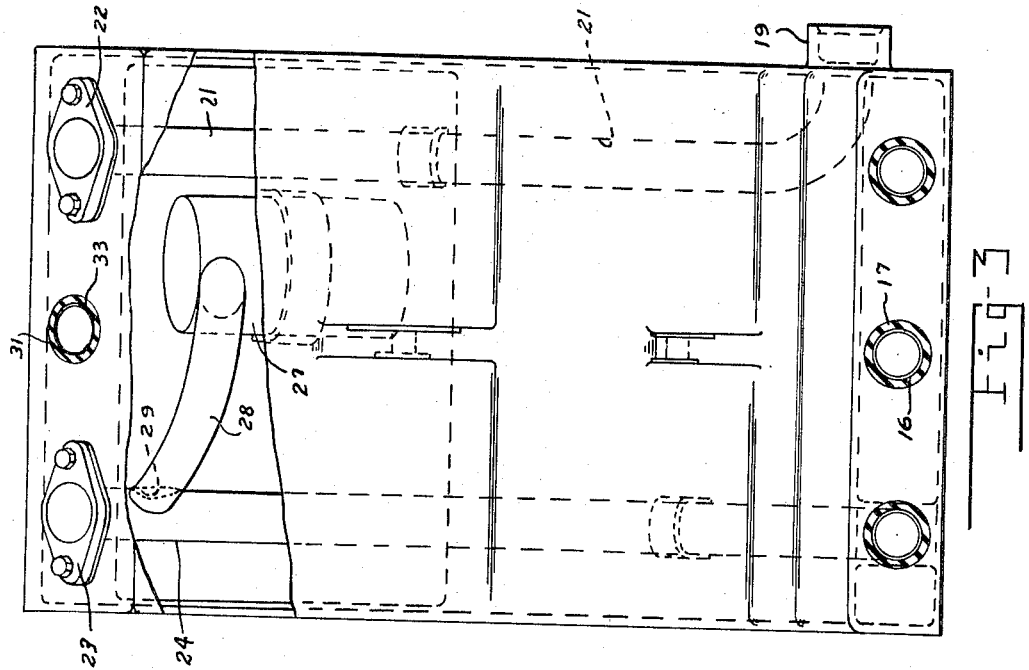
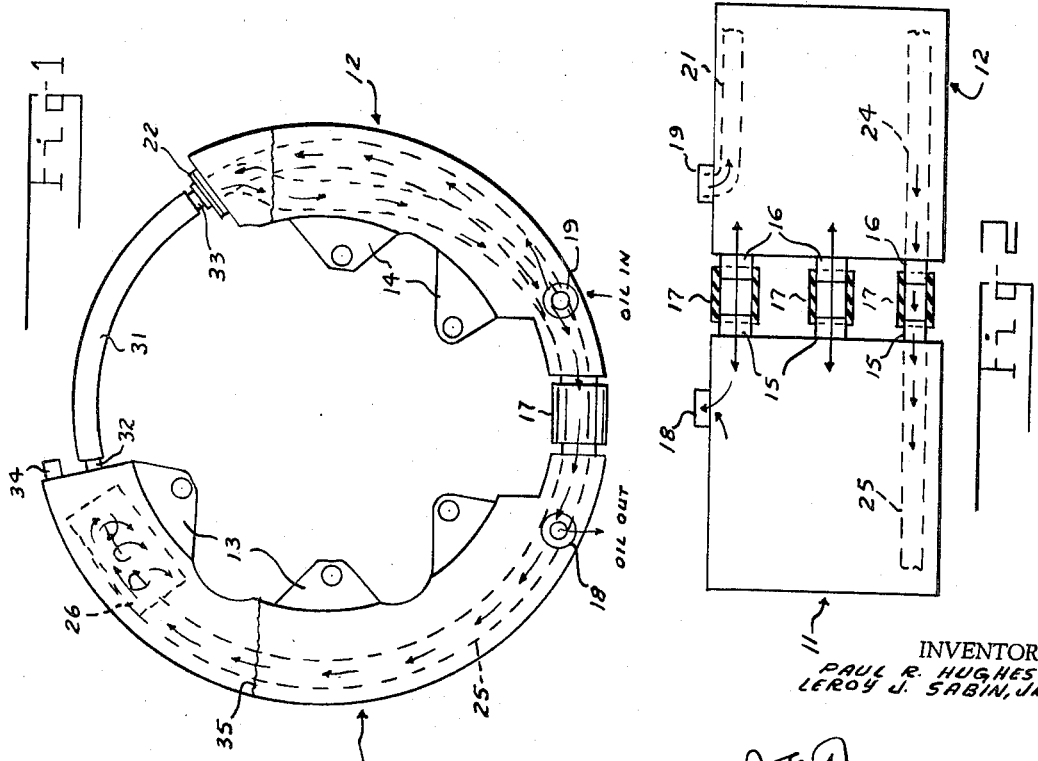
INVENTORS
PAUL R. HUGHES
LEROY J. SABIN, JR.
BY
*J. E. Beringer*
Their ATTORNEY

United States Patent Office 3,316,692
Patented May 2, 1967

3,316,692
LIQUID STORAGE TANK
Paul R. Hughes, Englewood, and Leroy J. Sabin, Jr., Dayton, Ohio, assignors to United Aircraft Products, Inc., Dayton, Ohio, a corporation of Ohio
Filed Dec. 15, 1965, Ser. No. 513,985
6 Claims. (Cl. 55—204)

This invention relates to liquid reservoirs in liquid circulating systems returning to the reservoir a liquid-air mixture.

An object of the invention is expeditiously to separate air from liquid in the returning mixture and to vent the air out of the reservoir.

Another object of the invention is to achieve a balanced storage of liquid in a tank separated into two sections having only limited communication at their bottom portions, it being an attendant object to divide the returning liquid-air mixture into separate streams directed respectively to the separate reservoir sections and to carry out a deaerating function in connection with each stream.

A further object of the invention is to regulate by-passing flow of a portion of a returning liquid-air mixture as described in a manner to achieve a substantially balanced liquid level condition between communicating reservoir sections.

Other objects and structural details of the invention will appear from the following description, when read in connection with the accompanying drawings, wherein:

FIG. 1 is a partly diagrammatic view in front elevation of a reservoir in accordance with the illustrated embodiment of the invention;

FIG. 2 is a bottom view, partly diagrammatic, of the reservoir of FIG. 1; and

FIG. 3 is a view in side of a first one of the sections comprising the reservoir of FIG. 1.

Referring to the drawings, a reservoir in accordance with the illustrated embodiment of the invention is comprised of tank sections 11 and 12 separable for ease of installation. Thus, the tanks 11 and 12 have an arcuate configuration and when assembled occupy an opposing complementary position relative to one another to define a circular outline. On the inner periphery of the tank 11 are inwardly projecting mounting flanges 13. Similar flanges 14 are on the inner periphery of tank 12. In the installation of the reservoir the separate tank sections 11 and 12 are applied to opposing sides of a gas turbine engine or the like which becomes thus partly surrounded by the reservoir. The flanges 13 and 14 are anchored to suitable stationary supports, mounting the tank sections in a position substantially as shown. As will hereinafter be more particularly described, the tank sections are placed in communication with one another at what may be considered their lower ends so that they combine to form in effect a single liquid storage place. The separable arrangement of the tanks, however, allows the reservoir to be installed by bringing its component tanks to an installed position from opposite sides of the engine. A single tank constructed to the configuration of the instant reservoir may not lend itself to assembly on the engine in the required position.

The tank sections 11 and 12 normally occupy an upright position as illustrated, with their lower ends in an opposed nearby relation to one another. On such lower end of the tank 11 are longitudinally spaced apart bosses in surrounding, projecting relation to openings (not shown) in the tank. Similar bosses 16 are on the lower end of the tank section 12 and are in opposing aligned relation to the bosses 15. Each opposing pair of bosses 15 and 16 is interconnected in a fluid tight manner by a coupling 17 which may for example be a length of rubber hose. Near the bottom of the tank 11 is another boss 18 surrounding and defining an opening to this tank section. A similar boss 19 defines and surrounds an opening in the lower portion of tank section 12. The bosses 18 and 19 comunicate the exterior of the reservoir with what may be considered the normal lower portions of the respective tanks 11 and 12, having regard to the normal attitude of the reservoir. As will hereinafter more clearly appear, the boss 18 and opening defined thereby represents the reservoir outlet. Through a suitable fluid tight connection and extending flow lines this outlet opening is communicated to a place of use of the stored liquid. The opening defined by boss 19 represents the reservoir inlet and communicates through suitable attached flow lines with pump means which returns the liquid to the reservoir for storage and reuse.

The reservoir of the illustrated embodiment of the invention is, as noted heretofore, adapted for use with a turbine engine or the like. In this application, it stores oil useful as a lubricant or as a hydraulic fluid or both. The reservoir will thus be described as having an oil circulated therethrough, although it will be understood that the environmental use of the tank and the liquid stored therein may take other forms.

Drawn from a sump by a pump of excess capacity, the returning oil incorporates substantial amounts of air and is in fact a liquid-air mixture. It is, of course, desirable that the liquid drawn from outlet 18 should be as free of air as possible. The returning liquid air mixture is conducted upwardly within tank section 12 from inlet 19 in a segregated relation to the body of contained oil within the tank section. Thus, a tube 21 communicates at its lower end with inlet 19 and extends upward within tank section 12 to a fitting 22 at the top thereof. Through a suitable connection with fitting 22, the oil is passed through a communicating heat exchanger or the like and returns to the tank section 12 by way of another fitting 23 at the top of the tank. Receiving the returning oil-air mixture through the fitting 23 is the upper end of a tubular conduit 24 which extends back down to the lower end of the tank section 12 to connect to one of the bosses 16. Flowing through the interconnection afforded by boss 16, hose 17 and boss 15, the oil-air mixture is picked up by another tubular conduit 25 and conducted thereby into the normal upper portion of tank section 11. Thus, conduit 25 connects at its lower end to the boss 15 and reaches into the upper end of the tank section 11. There it achieves a tangential connected relation to a cylindrical open ended deaerator "can" 26. There the liquid air mixture discharges and follows a helical course downward in the can to discharge from the bottom thereof into the tank section interior. Air released by the helical movement of the mixture rises through the upper end of the can and collects in the normal upper end of the tank section above the liquid level.

In the normal upper portion of the tank section 12 is a deaerator device 27 like the device 26. It is joined by a short length of tubular conduit 28 to the conduit 24, the latter having in a side wall thereof an opening 29 with which one end of the conduit 28 communicates. The oil-air mixture is, as noted, returned to the reservoir under pressure. It continues under pressure as it is conducted through the heat exchanger or the like from fitting 22 to fitting 23. Opening 29 is located in conduit 24 near the upper end thereof remote from the deaerator device 26 which is located at what may be considered the far end of a passage as defined by the communicating conduits 24–25. There is accordingly adequate pressure drop to insure that a part of the oil-air mixture in conduit 24 is by-passed through opening 29 and conduit 28 into the deaerator device 27. Within such device, the mixture has imparted thereto a helical motion, as in the case of device 26, developing forces separating air from the oil. While the oil drops through the bottom of the device into the tank section 12 proper, the air rises through the top thereof and collects in the upper end of the tank 12 above the liquid level therein.

The vent system provides an interconnecting line 31, which may be a hose connection as shown, extending between bosses 32 and 33 at the upper ends of tank sections 11 and 12 respectively. The bosses 32 and 33 surround and define openings into the normal upper portions of their respective tank sections. Accordingly, the normal upper portions of the tank sections are in communication with one another through the line 31. Further, the normal upper portion of tank section 11 is open to atmosphere through another opening therefrom as defined by a boss 34.

The vent system obviates an increase in air pressure in the upper portion of one tank section relative to the air pressure in the other. The liquid level in the two tank sections may thus rise and fall in a condition of equilibrium. The normal liquid level may be as indicated at 35 in a position maintaining the outlet port 18 flooded but being not in a submerging relation to the upper ends of the deaerator devices 26 and 27.

There are in the illustrated instance three hose connections 17 between the lower ends of the tank sections 11 and 12. One of these affords a connection between conduit portion 24 and 25 of the return line. The other two provide for an exchange of oil between the tank sections. In order that the problem of maintaining substantially equal amounts of oil in the tank sections may not fall entirely upon the intercommunication afforded by the two lines 17, the opening 29 is made to assume the character of a critical orifice. That is, the area of opening 29 is sized to achieve a predetermined rate of flow of the oil-air mixture into the deaerator 27. A proportion of the total volume of the returning oil-air mixture thus is by-passed into the tank section 12 for a balanced flow. Filling of the tank section 11 at a rate slower or faster than can be compensated for by an exchange of liquid through the bottom connections 17 thus is obviated.

What is claimed is:

1. A liquid reservoir for use in a liquid circulating system returning a liquid-air mixture to said reservoir, said reservoir comprising first and second sections having limited communication with one another at normal bottom portions thereof, a liquid return conduit entering said first section and reaching therethrough into the said second section, deaerator means in said first section, a flow connection from said conduit to said deaerator means bypassing a portion of the returning liquid-air mixture directly into said first section by way of said deaerator means, means for venting the normal upper portions of said sections, and a liquid outlet located in the normal bottom portion of one of said sections, said return conduit entering said first section at the top thereof extending downward herein and interconnecting said sections at their normal bottom portions, said return conduit having an orifice in the wall thereof in the normal upper portion of said first section forming part of said flow connection to said deaerator means.

2. A liquid reservoir according to claim 1, wherein said return conduit reaches into the normal upper portion of said second section, characterized by deaerator means in said second section in which said return conduit terminates, the said venting means including connections intercommunicating the normal portions of said first and second sections.

3. A liquid reservoir according to claim 2, characterized in that said deaerator means are open ended centrifuge devices releasing air through the tops thereof, the tops of both said devices extending above the normal liquid levels in their respective sections.

4. A liquid reservoir according to claim 1, characterized in that said outlet is located in said second section.

5. A liquid reservoir according to claim 1, characterized in that said orifice is sized to obtain a balanced flow to said sections.

6. A liquid reservoir according to claim 1, characterized in that said sections are arcuate in shape and mounted in an opposing relation to define a reservoir of annular configuration, bottom portions of said sections being joined by spaced apart tubes one of which is said return conduit.

References Cited by the Examiner
UNITED STATES PATENTS

| | | | |
|---|---|---|---|
| 2,364,119 | 12/1944 | Anderson | 55—182 |
| 2,800,975 | 7/1957 | Carroll et al. | 55—182 |
| 2,982,374 | 5/1961 | Hughes et al. | 55—182 |
| 2,983,331 | 5/1961 | Helsley | 55—182 X |
| 3,113,871 | 12/1963 | Webster | 55—204 X |
| 3,130,022 | 4/1964 | Clark | 55—204 X |

REUBEN FRIEDMAN, *Primary Examiner.*

R. W. BURKS, *Assistant Examiner.*